United States Patent Office 3,505,059
Patented Apr. 7, 1970

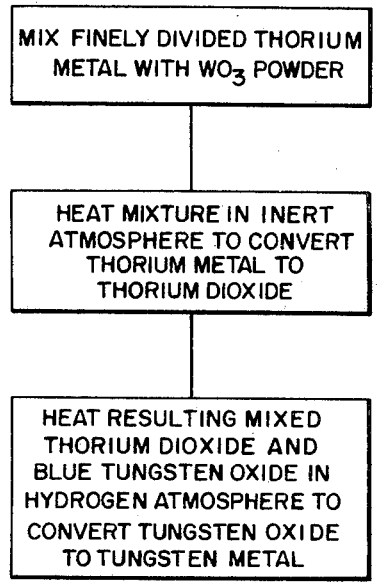

3,505,059
METHOD FOR FORMING FINE AND UNIFORM DISPERSION OF THORIUM DIOXIDE IN TUNGSTEN POWDER
Nicholas F. Cerulli, North Caldwell, N.J., assignor to Westinghouse Electric Corporation, Pittsburgh, Pa., a corporation of Pennsylvania
Filed Sept. 30, 1966, Ser. No. 583,336
Int. Cl. H01b 1/02; H01k 1/08; B22f 1/00
U.S. Cl. 75—.5          5 Claims This invention relates generally to doping of tungsten powder and, more particularly, to a method for forming a very fine and uniform dispersion of thorium dioxide in tungsten metal powder.

Thoria-doped tungsten is used in some special types of lamps which requires extremely high strength filaments. Such doped tungsten also has application in tungsten wire or structural members which require high strength at high temperatures. When doping the tungsten with the thoria doping constituent, it has been customary to add a solution of thorium nitrate either to tungsten metal powder, tungstic oxide or tungstic acid. The thorium nitrate is then converted to thorium dioxide by heating. The tungsten oxide or tungstic acid is converted to metal powder by heating in hydrogen atmosphere and the thorium dioxide is thus dispersed throughout the resulting formed tungsten metal powder.

It is desirable to achieve as fine and as uniform a dispersion of the thorium dioxide as possible. While the decomposition of thorium nitrate to thorium oxide does produce a dispersion which is reasonably uniform, there is some tendency for the formed thorium dioxide to agglomerate.

It is the general object of the present invention to provide a method for forming a very fine and uniform dispersion of thorium dioxide in tungsten metal powder.

It is another object of the invention to provide a method for forming a very fine and uniform dispersion of thorium dioxide in tungsten metal powder, which resulting doped tungsten can be used for making lamp filaments.

It is a further object to provide a method for forming a very fine and uniform dispersion of thorium dioxide in tungsten metal powder, which doped powder can be used for making tungsten wire or structural members which have high strength at high temperatures.

The foregoing objects of the invention, and other objects which will become apparent as the description proceeds, are achieved by distributing finely divided thorium metal throughout finely divided yellow tungsten oxide powder. The total amount of distributed thorium metal should not exceed about 5% by weight of the yellow tungsten oxide powder. The mixture is then heated in an inert atmosphere at a temperature of from about 950° C. up to the temperature at which blue tungsten oxide will begin to volatilize, under the heating conditions used, and this heating is continued for a sufficient time to convert the thorium metal to thorium dioxide through reaction with the tungsten oxide. Thereafter the resulting mixture of tungsten oxide and thorium dioxide are heated in a conventional fashion in a hydrogen atmosphere to convert the tungsten oxide to tungsten metal powder which has the thorium dioxide distributed therethrough in a very fine and uniform manner.

For a better understanding of the present invention, reference should be had to the sole figure of the drawing which sets forth a flow chart illustrating the basic steps of the present method.

In practicing the present method, yellow tungsten oxide ($WO_3$) is first prepared in conventional fashion, such as by heating tungstic acid in an air atmosphere. The yellow tungsten oxide is in finely divided form and, as an example, has an average particle diameter less than about five microns. It should be understood that the state of division of the yellow tungsten oxide powder is not critical and may be varied. Finely divided thorium metal is thoroughly mixed with the yellow tungsten oxide powder in such amount that the thorium metal does not exceed about 5% by weight of the yellow tungsten oxide. The thorium metal preferably is in such a state of division that it will pass a number 325 mesh sieve, although the actual state of division of the thorium metal powder is not critical and may be varied. In order to insure a thorough mixing of the thorium metal and yellow tungsten oxide, it is preferred to ball mill the resulting mixture and a ball milling period of one hour has been found to be suitable.

As shown in the accompany flow chart, the thoroughly mixed yellow tungsten oxide and finely divided thorium metal are then heated in an inert atmosphere, preferably argon, at a temperature of from about 950° C. up to the temperature at which blue tungsten oxide ($W_{20}O_{58}$) will begin to volatilize, and this heating is continued for a sufficient time to convert the thorium metal to thorium dioxide. Inert atmospheres other than argon can be substituted therefor, such as another noble gas or nitrogen. Under the usual conditions of processing, the heating will be conducted at atmospheric pressure, and in order to insure that the resulting formed blue tungsten oxide will not volatilize, the heating under atmospheric conditions should not exceed a temperature of about 1200° C. If the heating were to be conducted under pressure conditions, however, the maximum temperature of heating could be raised according to the pressure used. As a specific example, the foregoing heating is conducted at a temperature of about 1025° C. for a period of about two hours using argon at atmospheric pressure as the heating atmosphere.

The foregoing heating causes the tungsten oxide ($WO_3$) and thorium metal to react to form thorium dioxide and blue tungsten oxide ($W_{20}O_{58}$). Even though the thorium metal is added in particulate form, the resulting chemical reaction breaks down the thorium metal particles and the thorium dioxide thus produced is dispersed throughout the blue tungsten oxide in an extremely fine and uniform manner. This resulting dispersion is so uniform that when the thorium metal and yellow tungsten oxide are used to such amount as to permit a stoichiometric reaction to form thorium dioxide and blue tungsten oxide, the resulting heated, doped material has a uniform blue appearance. At temperatures above about 1050° C. there is a tendency to form a small amount of purple tungsten oxide ($W_{18}O_{49}$), but this does not effect the uniform dispersion which is achieved.

As noted hereinbefore, when the thorium metal is present in amount of 5% by weight of the yellow tungsten oxide, the resulting material after firing will have a blue appearance which is uniform throughout. Less than 5% by weight of the thorium metal may be added and a very uniform doping of thorium oxide will still result, since the oxidization of the thorium metal during the reaction provides for this uniform and fine distribution of formed thorium oxide. Accordingly, any desired amount of thorium metal, up to 5% by weight of the yellow tungsten oxide, may be added in the doping process.

After the mixed yellow oxide and thorium metal are heated as indicated, the further reduction to tungsten metal is conventional, and the blue oxide and mixed thorium dioxide are heated in a hydrogen atmosphere at a sufficient temperature and for a sufficient time to reduce the tungsten oxide to metal. As an example, a temperature of about 900° C. is utilized and a heating period of about one hour is satisfactory. This final reduction temperature is subject to considerable variation, as is well known.

The doped tungsten metal powder is thereafter formed into tungsten wire or into tungsten structural members in accordance with conventional powder metallurgy practices, namely, forming a compact, electrically sintering the compact in a hydrogen atmosphere, and thereafter swaging and drawing in the case of wire, or swaging or rolling in the case of structural shapes.

It will be recognized that the objects of the invention have been achieved by providing a method for forming a very fine and uniform distribution of thorium dioxide doping in tungsten metal powder, which tungsten metal powder can be used in making lamp filaments or structural members or wire which are required to have high strength at very high temperatures.

While a preferred embodiment of the invention has been illustrated and described in detail, it is to be particularly understood that the invention is not limited thereto or thereby.

I claim as my invention:

1. The method of forming a very fine and uniform dispersion of thorium dioxide doping in tungsten metal powder, said method comprising:
    (a) distributing throughout the tungsten to be doped, when in the form of finely divided yellow tungsten oxide ($WO_3$), a predetermined amount of finely divided thorium metal, with the total amount of distributed thorium metal not exceeding about five percent by weight of said yellow tungsten oxide;
    (b) heating said mixed yellow oxide and thorium metal in an inert atmosphere, at a temperature of from about 950° C. up to the temperature at which blue tungsten oxide ($W_{20}O_{58}$) will begin to volatilize, for a sufficient time to convert said thorium metal to thorium dioxide; and
    (c) thereafter heating the resulting mixture of blue tungsten oxide and thorium dioxide in a hydrogen atmosphere at a sufficient temperature and for a sufficient time to reduce the tungsten oxide to metal.

2. The method as specified in claim 1, wherein said mixed yellow tungsten oxide and thorium metal are heated in an inert atmosphere at atmospheric pressure at a temperature of from about 950° C. to 1200° C.

3. The method as specified in claim 2, wherein said inert atmosphere is an argon atmosphere.

4. The method as specified in claim 3, wherein said mixed yellow tungsten oxide and said thorium metal are heated at a temperature of about 1025° C. for a period of about two hours.

5. The method as specified in claim 4, wherein said thorium metal is sufficiently finely divided to pass a No. 325 mesh sieve, said yellow tungsten oxide has an average particle size less than about five microns, and said resulting mixture of tungsten oxide and thorium dioxide are converted to a mixture of tungsten metal powder and thorium dioxide by heating in a hydrogen atmosphere at a temperature of about 900° C. for a period of about one hour.

References Cited

UNITED STATES PATENTS

| | | | |
|---|---|---|---|
| 1,635,055 | 7/1927 | Pacz | 75—207 |
| 3,278,281 | 10/1966 | Ehringer | 75—206 |

L. DEWAYNE RUTLEDGE, Primary Examiner

T. R. FRYE, Assistant Examiner

U.S. Cl. X.R.

75—207